United States Patent
Yuasa

(10) Patent No.: US 10,029,576 B2
(45) Date of Patent: Jul. 24, 2018

(54) POWER RECEIVING DEVICE, POWER TRANSMITTING DEVICE, AND VEHICLE

(71) Applicant: TOYOTA JIDOSHA KABUSHIKI KAISHA, Toyota-shi, Aichi-ken (JP)

(72) Inventor: Hiroaki Yuasa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 841 days.

(21) Appl. No.: 14/462,008

(22) Filed: Aug. 18, 2014

(65) Prior Publication Data

US 2015/0069833 A1    Mar. 12, 2015

(30) Foreign Application Priority Data

Sep. 11, 2013 (JP) ................ 2013-188444

(51) Int. Cl.
| | |
|---|---|
| *B60L 11/18* | (2006.01) |
| *H02J 50/12* | (2016.01) |
| *H02J 50/70* | (2016.01) |
| *H01F 38/14* | (2006.01) |
| *H02J 5/00* | (2016.01) |
| *H02J 7/02* | (2016.01) |

(52) U.S. Cl.
CPC ......... *B60L 11/182* (2013.01); *B60L 11/1829* (2013.01); *H01F 38/14* (2013.01); *H02J 50/12* (2016.02); *H02J 50/70* (2016.02); *H02J 5/005* (2013.01); *H02J 7/025* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
None
See application file for complete search history.

(56) References Cited

U.S. PATENT DOCUMENTS

| 7,741,734 B2 | 6/2010 | Joannopoulos et al. |
|---|---|---|
| 2007/0222542 A1 | 9/2007 | Joannopoulos et al. |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |

(Continued)

FOREIGN PATENT DOCUMENTS

| AU | 2006269374 B2 | 1/2007 |
|---|---|---|
| AU | 2006269374 C1 | 1/2007 |

(Continued)

*Primary Examiner* — Thienvu Tran
*Assistant Examiner* — David M Stables
(74) *Attorney, Agent, or Firm* — Oliff PLC

(57) ABSTRACT

A power receiving device includes a power receiving coil formed to surround space around a coil central axis extending in a front-back direction of a vehicle body, for receiving electric power from a power transmitting coil in a non-contact manner while facing the power transmitting coil, a capacitor arranged adjacent to the power receiving coil in the direction in which the coil central axis extends, and a shield arranged between the power receiving coil and the capacitor. The effect on the capacitor during electric power transmission can be reduced.

5 Claims, 5 Drawing Sheets

(56) References Cited

U.S. PATENT DOCUMENTS

| | | |
|---|---|---|
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalts et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2013/0127409 A1 | 5/2013 | Ichikawa |
| 2013/0193749 A1 | 8/2013 | Nakamura et al. |
| 2013/0320759 A1* | 12/2013 | Abe ............... H01F 38/14 307/10.1 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | 2000-124656 A | 4/2000 |
| JP | A-2009-501510 | 1/2009 |
| JP | 2010-074937 A | 4/2010 |
| JP | 2012-204469 A | 10/2012 |
| JP | A-2012-222956 | 11/2012 |
| JP | A-2013-110822 | 6/2013 |
| JP | A-2013-126327 | 6/2013 |
| JP | A-2013-146148 | 7/2013 |
| JP | A-2013-146154 | 7/2013 |
| JP | B2-5224295 | 7/2013 |
| JP | A-2013-154815 | 8/2013 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | WO 2013/108108 A2 | 7/2013 |

* cited by examiner

POWER RECEIVING DEVICE, POWER TRANSMITTING DEVICE, AND VEHICLE This nonprovisional application is based on Japanese Patent Application No. 2013-188444 filed on Sep. 11, 2013 with the Japan Patent Office, the entire contents of which are hereby incorporated by reference.

BACKGROUND OF THE INVENTION

Field of the Invention

The present invention relates to a power transmitting device and a power receiving device for transmitting and receiving electric power in a non-contact manner, and a vehicle including such a power receiving device.

Description of the Background Art

A power transmitting device and a power receiving device for transmitting and receiving electric power in a non-contact manner is known, as disclosed in Japanese Patent No. 5224295, Japanese Patent Laying-Open No. 2013-154815, Japanese Patent Laying-Open No. 2013-146154, Japanese Patent Laying-Open No. 2013-146148, Japanese Patent Laying-Open No. 2013-110822, and Japanese Patent Laying-Open No. 2013-126327. The devices disclosed in Japanese Patent No. 5224295 each include a coil and a capacitor connected to this coil. The capacitor is located at a position to form a resonant circuit together with the coil so as to increase power transmission efficiency.

SUMMARY OF THE INVENTION

When arranging a power receiving coil such that a coil central axis extends in a front-back direction of a vehicle body, and containing a capacitor and the power receiving coil in a single housing, there are roughly two possible positions where the capacitor is arranged. In the first case, the capacitor is arranged adjacent to the power receiving coil in the front-back direction of the vehicle body. In the second case, the capacitor is arranged adjacent to the power receiving coil in a width direction of the vehicle body.

In the second case where the coil and the capacitor are aligned together in the vehicle width direction, the coil central axis and a center line of the housing will generally be misaligned with each other in the vehicle width direction. As a result, even if the vehicle is parked in such a manner that a center line of a power transmitting device in the vehicle width direction faces a center line of a power receiving device (housing) in the vehicle width direction, a power transmitting coil and the power receiving coil may be misaligned with each other in the vehicle width direction.

If the capacitor is arranged in the front-back direction relative to the coil as in the first case described above, the capacitor may be affected by a magnetic field or electric field generated during electric power transmission, or may be affected by heat generation in the coil or members arranged around the coil. When the capacitor is affected by them, the capacitance of the capacitor varies to vary the resonant frequency of the resonant circuit, which may result in lower power transmission efficiency.

An object of the present invention is to provide a power receiving device and a power transmitting device capable of reducing the effect on a capacitor during electric power transmission, and a vehicle including such a power receiving device.

A power receiving device arranged on a bottom surface of a vehicle body includes a power receiving coil formed to surround space around a coil central axis extending in a front-back direction of the vehicle body, for receiving electric power from a power transmitting coil in a non-contact manner while facing the power transmitting coil, a capacitor arranged adjacent to the power receiving coil in the direction in which the coil central axis extends, and a shield arranged between the power receiving coil and the capacitor.

According to this configuration where the capacitor is arranged adjacent to the power receiving coil in the front-back direction, a center line of the power receiving device in a vehicle width direction can be matched to a center line of the power receiving coil in the vehicle width direction, that is, the coil central axis of the power receiving coil. Thus, the power transmitting coil and the power receiving coil can correctly face each other easily by alignment of a central portion of the power receiving device in the vehicle width direction and a central portion of a power transmitting device in the vehicle width direction. Because of the shield provided between the capacitor and the power receiving coil, transmission of an electromagnetic field, which is generated around the power receiving coil during electric power transmission, to the capacitor can be suppressed, and furthermore, heat transfer from the power receiving coil to the capacitor can also be suppressed.

Preferably, the power receiving device further includes a core around which the power receiving coil is wound. In the direction in which the coil central axis extends, a length between the shield and the core is longer than a length between the shield and the capacitor. According to this configuration, eddy current loss that occurs in the shield can be reduced.

Preferably, the shield includes a wall portion positioned between the power receiving coil and the capacitor, and a fixing portion for fixing the wall portion to a housing containing the power receiving coil. A width dimension of the fixing portion in a width direction of the vehicle body is larger than a width dimension of the power receiving coil in the width direction of the vehicle body. According to this configuration, flow of the air warmed around the power receiving coil toward the capacitor by convection can be suppressed.

Preferably, the power receiving device further includes a fastening tool for fixing the power receiving coil to the housing. The fixing portion is fixed to the housing by the fastening tool. According to this configuration, the shield and the power receiving coil can be fastened together to thereby reduce the number of components.

A vehicle includes an engine provided in front of a center position in a front-back direction of a vehicle body, and the power receiving device described above. In the front-back direction of the vehicle body, the power receiving device is positioned behind the engine and in front of the center position.

According to this configuration where the engine is mounted on a front side of the vehicle, most of the weight is placed on the front side of the vehicle as a whole. Thus, when a person or an object gets in the vehicle, the front side of the vehicle does not move vertically as much as a rear side of the vehicle. Since the power receiving device is arranged in front of the center position of the vehicle, vertical displacement of the power receiving device when a person or an object gets in the vehicle can be suppressed to low level, thus suppressing variation in power transmission efficiency to low level. Since the power receiving device is provided away from the engine, heat transfer from the engine to the power receiving device can also be suppressed.

Preferably, the vehicle further includes a catalyst connected to the engine. In the front-back direction of the vehicle body, the power receiving coil is arranged behind the catalyst, and in the front-back direction of the vehicle body, the capacitor is arranged behind the power receiving coil. According to this configuration, heat transfer from the catalyst to the capacitor can be suppressed.

A power transmitting device arranged in a parking space includes a power transmitting coil formed to surround space around a coil central axis extending in a front-back direction of the parking space, for transmitting electric power to a power receiving coil in a non-contact manner while facing the power receiving coil, a capacitor arranged adjacent to the power transmitting coil in the direction in which the coil central axis extends, and a shield arranged between the power transmitting coil and the capacitor.

Preferably, the power transmitting device further includes a core around which the power transmitting coil is wound. In the direction in which the coil central axis extends, a length between the shield and the core is longer than a length between the shield and the capacitor.

According to the present invention, a power receiving device and a power transmitting device capable of reducing the effect on a capacitor during electric power transmission, and a vehicle including such a power receiving device can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments based on the present invention will be described below with reference to the drawings. When a reference is made to a number, an amount and the like in the description of the embodiments, the scope of the present invention is not necessarily limited to the number, the amount and the like unless otherwise specified. In the description of the embodiments, the same or corresponding components are designated by the same reference numbers and redundant description may not be repeated.

Figure 1:
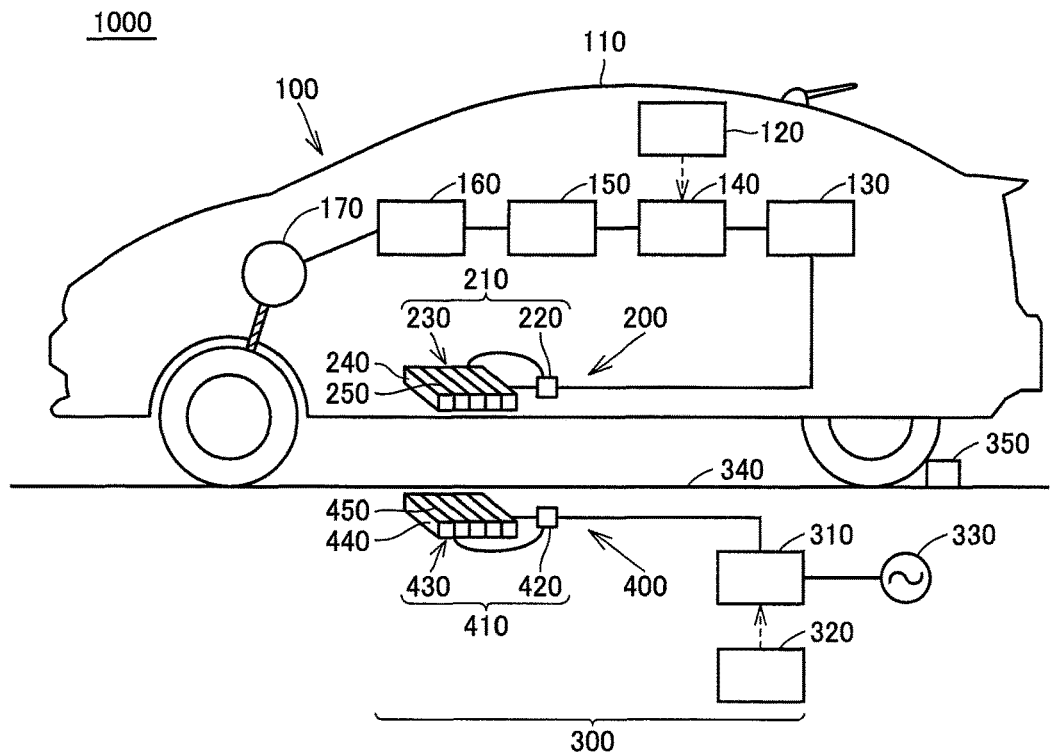
FIG. 1 schematically shows an electric power transmission system in an embodiment.

FIG. 1 schematically shows an electric power transmission system 1000 in an embodiment. Electric power transmission system 1000 includes an electrically powered vehicle 100 (vehicle) and an outside power feeding apparatus 300. An overall configuration of electrically powered vehicle 100 and outside power feeding apparatus 300 will be successively described below.

(Electrically Powered Vehicle 100)

Electrically powered vehicle 100 includes a vehicle body 110 and a power receiving device 200. Vehicle body 110 is provided with a vehicle ECU 120. (ECU: Electronic Control Unit), a rectifier 130, a DC/DC converter 140, a battery 150, a power control unit 160, a motor unit 170 and the like.

Power receiving device 200 is arranged on a bottom surface of vehicle body 110 (described later in detail). When electrically powered vehicle 100 is parked in a parking space 340 and a power receiving coil 250 of power receiving device 200 faces a power transmitting device 400 (power transmitting coil 450) of outside power feeding apparatus 300, power receiving device 200 receives electric power from power transmitting device 400 in a non-contact manner. Parking space 340 is provided with chocks 350 and parking lines 360 indicating a parking position and a parking region (see FIG. 2).

Figure 4:
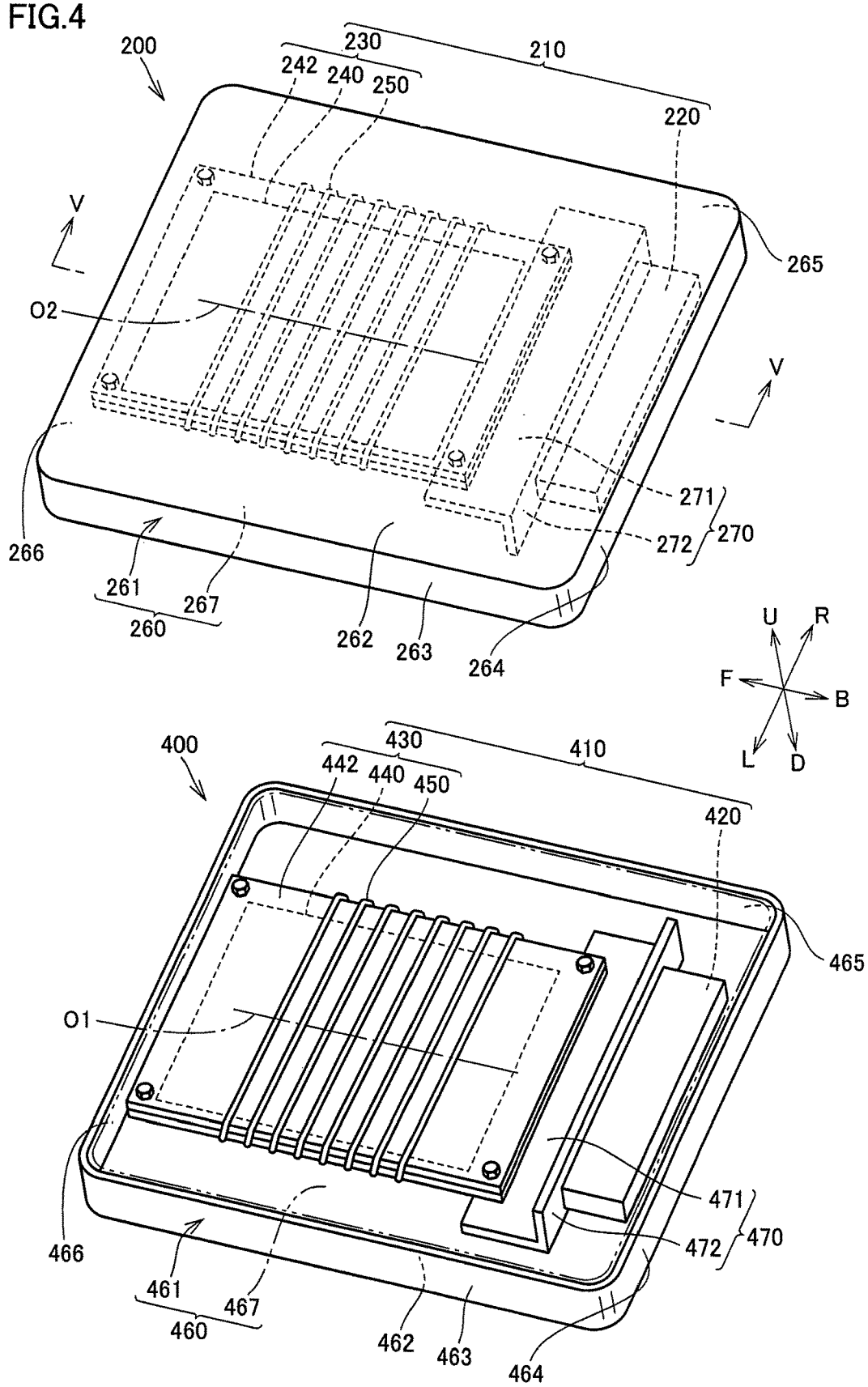
FIG. 4 is a perspective view showing a power receiving device and a power transmitting device in the embodiment.
Figure 5:
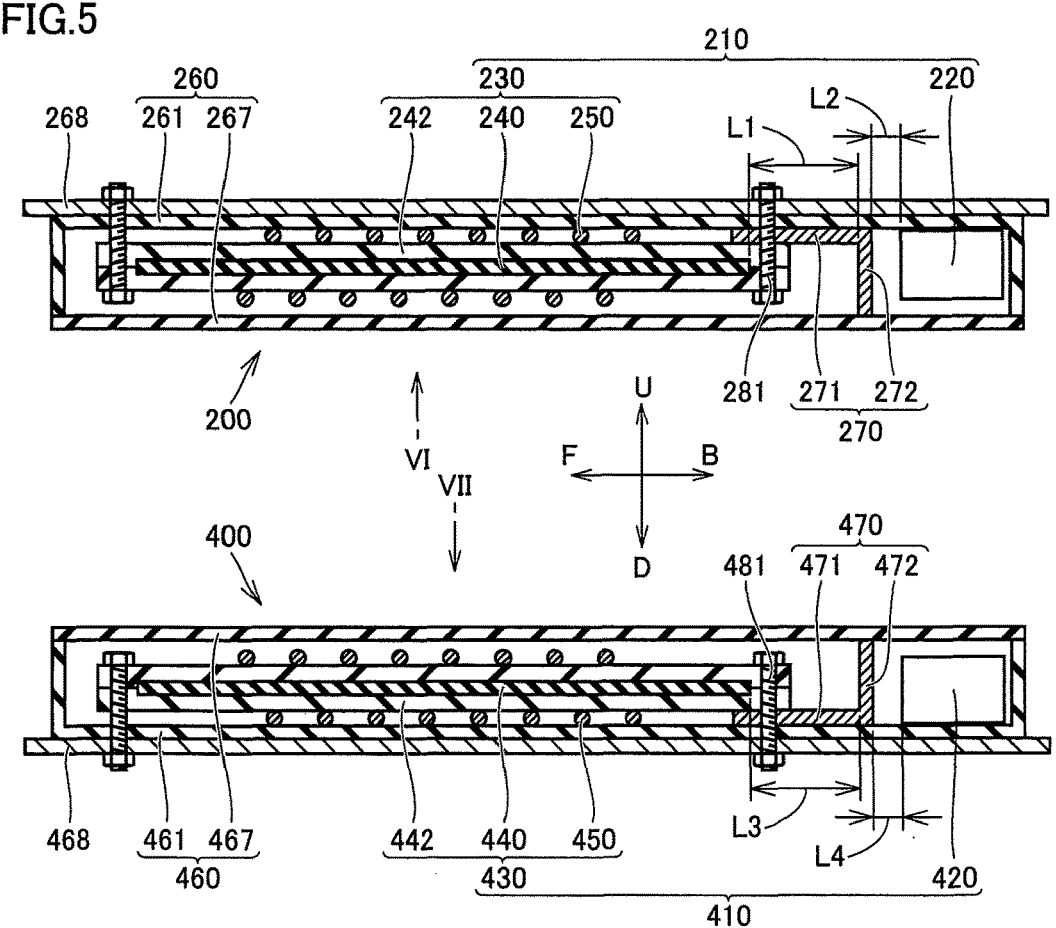
FIG. 5 is a cross-sectional view taken along line V-V in the direction of arrows in FIG. 4.

Power receiving device 200 includes a power receiving unit 210 and a housing 260 containing power receiving unit 210 (see FIGS. 4 and 5). Power receiving unit 210 has a solenoid-type coil unit 230, and a capacitor 220 connected to coil unit 230. Coil unit. 230 is formed of a core 240 made of ferrite, a fixing member 242 made of resin for fixing core 240 (see FIGS. 4 to 6), and power receiving coil 250 (secondary coil).

Figure 2:
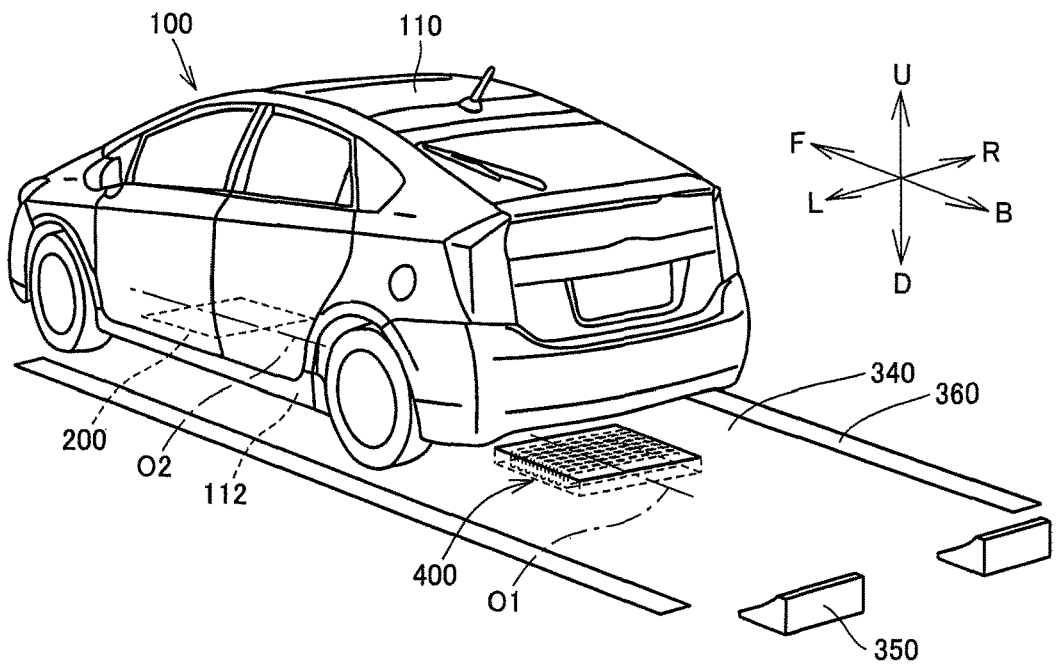
FIG. 2 is a perspective view showing an electrically powered vehicle in the embodiment.
Figure 3:
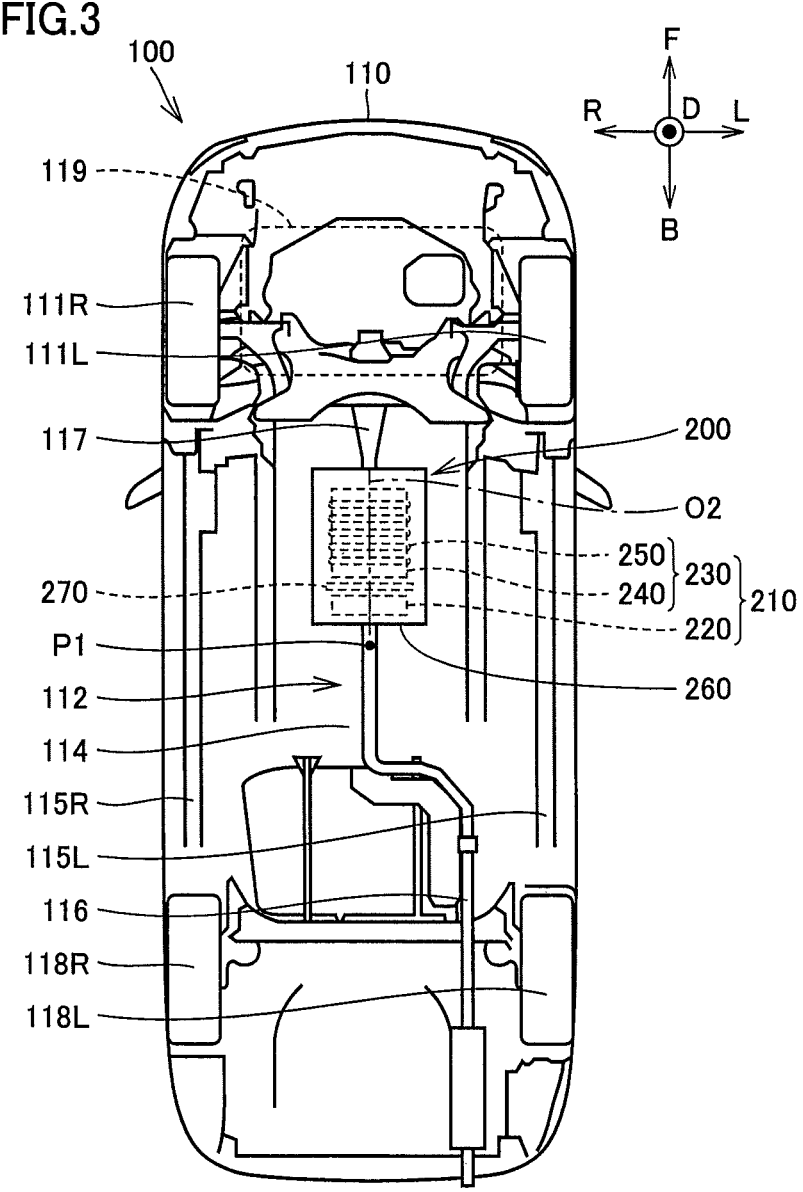
FIG. 3 is a bottom view showing the electrically powered vehicle in the embodiment.

Power receiving coil 250 is wound around an outer peripheral surface of the above fixing member, and is formed to surround the space around a coil central axis O2 (see FIGS. 2 to 4). Coil central axis O2 extends in a direction parallel to a front-back direction of vehicle body 110. Power receiving coil 250 has a stray capacitance, and is connected to rectifier 130. An electric circuit is formed by the induction coefficient of power receiving coil 250, the stray capacitance of power receiving coil 250, and the capacitance of capacitor 220. With regard to power receiving coil 250, the number of its turns is appropriately set so as to increase the distance to power transmitting coil 450 of power transmitting device 400, and a Q value (for example, Q≥100) showing the intensity of resonance between power transmitting coil 450 and power receiving coil 250 and a coupling coefficient κ showing the degree of coupling therebetween.

DC/DC converter 140 is connected to rectifier 130. Rectifier 130 converts an alternating current supplied from power receiving device 200 to a direct current, and supplies the current to DC/DC converter 140. Battery 150 is connected to DC/DC converter 140. DC/DC converter 140 adjusts the voltage of the direct current supplied from rectifier 130, and supplies the current to battery 150.

Vehicle ECU 120 controls driving of DC/DC converter 140, power control unit 160 and the like. DC/DC converter 140 is not a required component but may be employed as necessary. If DC/DC converter 140 is not employed, a matching box may be provided between power transmitting device 400 and a high-frequency power device 310 of outside power feeding apparatus 300. This matching box may match the impedances and substitute for DC/DC converter 140.

Power control unit 160 is connected to battery 150. Motor unit 170 is connected to power control unit 160. Power control unit 160 includes a not-shown converter connected to battery 150, and a not-shown inverter connected to this converter.

The converter adjusts (boosts) the direct current supplied from battery 150, and supplies the current to the inverter. The inverter converts the direct current supplied from the converter to an alternating current, and supplies the current to motor unit 170. Motor unit 170 includes a motor generator functioning as a power generator, and a motor generator functioning as a motor. A three-phase AC motor may be used, for example, as motor unit 170. Motor unit 170 is driven by the alternating current supplied from the inverter of power control unit 160.

Although electrically powered vehicle 100 in this embodiment functions as a hybrid vehicle, electrically powered vehicle 100 may function as a fuel cell vehicle as long as it is driven by a motor unit. Electrically powered vehicle 100 may function as an electric vehicle as long as it is driven by a motor. Although it is a vehicle that receives the power in this embodiment, things other than the vehicle may receive the power.

(Outside Power Feeding Apparatus 300)

Outside power feeding apparatus 300 includes power transmitting device 400, high-frequency power device 310, and a power transmitting ECU 320. High-frequency power device 310 is connected to an AC power supply 330. AC power supply 330 is a commercial power supply, an independent power supply device or the like. Power transmitting device 400 is provided within parking space 340 and connected to high-frequency power device 310. Power transmitting ECU 320 controls driving of high-frequency power device 310 and the like.

Power transmitting device 400 includes a power transmitting unit 410 and a housing 460 containing power transmitting unit 410 (see FIGS. 4 and 5). Power transmitting unit 410 has a solenoid-type coil unit 430, and a capacitor 420 connected to coil unit 430. Coil unit 430 is formed of a core 440 made of ferrite, a fixing member 442 made of resin for fixing core 440 (see FIGS. 4, 5 and 7), and power transmitting coil 450 (primary coil).

Power transmitting coil 450 is wound around an outer peripheral surface of the above fixing member, and is formed to surround the space around a coil central axis O1 (see FIGS. 2 and 4). Coil central axis O1 extends in a direction parallel to a front-back direction of parking space 340. The front-back direction of parking space 340 refers to a direction corresponding to the front-back direction of electrically powered vehicle 100 when electrically powered vehicle 100 is parked at a prescribed position in parking space 340 where power transmission is possible. Coil central axis O1 extends in a direction parallel to parking lines 360 (FIG. 2), for example. Coil central axis O1 extends in a direction orthogonal to a direction in which chocks 350 (FIG. 2) are arranged, for example.

Power transmitting coil 450 has a stray capacitance, and is connected to high-frequency power device 310. An electric circuit is formed by the induction coefficient of power transmitting coil 450, the stray capacitance of power transmitting coil 450, and the capacitance of capacitor 420. Power transmitting ECU 320 controls the devices in outside power feeding apparatus 300. High-frequency power device 310 converts electric power supplied from AC power supply 330 to high-frequency electric power, and supplies the converted high-frequency power to power transmitting coil 450. Power transmitting coil 450 transmits the electric power to power receiving coil 250 of power receiving unit 210 in a non-contact manner by electromagnetic induction.

(Configuration of Bottom Surface of Electrically Powered Vehicle 100)

FIG. 2 is a perspective view showing electrically powered vehicle 100. FIG. 3 is a bottom view showing electrically powered vehicle 100. In FIGS. 2 and 3, "U" indicates a vertically upward direction, "D" indicates a vertically downward direction, "L" indicates a vehicle left-hand direction, "R" indicates a vehicle right-hand direction, "F" indicates a vehicle forward direction, and "B" indicates a vehicle backward direction. These directions apply to FIGS. 4 to 8 described later.

Referring to FIGS. 2 and 3, vehicle body 110 of electrically powered vehicle 100 includes a bottom surface 112. Bottom surface 112 is a visible area of vehicle body 110 when vehicle body 110 is seen at a distance in vertically downward direction D to the ground, with wheels 111R, 111L, 118R and 118L (FIG. 3) contacting the ground. Bottom surface 112 has a center position P1 (FIG. 3). Center position P1 is located in the center of bottom surface 112 in the front-back direction of vehicle body 110 (vehicle forward direction F and vehicle backward direction B), and is located in the center of bottom surface 112 in a vehicle width direction of vehicle body 110 (vehicle left-hand direction L and vehicle right-hand direction R).

As shown in FIG. 3, bottom surface 112 is provided with a floor panel 114, side members 115R, 115L, an exhaust pipe 116, a not-shown cross member and the like. Floor panel 114 has the shape of a plate, and separates the inside of vehicle body 110 from the outside of vehicle body 110. Side members 115R, 115L and the cross member are arranged on a lower surface of floor panel 114. Vehicle body 110 includes an engine 119 which is arranged in front of center position P1 (facing vehicle forward direction F) in the front-back direction. Exhaust pipe 116 is connected to engine 119 through a catalyst 117.

(Power Receiving Device 200)

As shown in FIG. 3, power receiving device 200 is provided on bottom surface 112 of vehicle body 110. Power receiving device 200 is arranged behind engine 119 (facing vehicle backward direction B) in the front-back direction, and in front of center position P1 (facing vehicle forward direction F) in the front-back direction. To fix power receiving device 200 to bottom surface 112, power receiving device 200 may be suspended from side members 115R, 115L or the cross member, or power receiving device 200 may be fixed to floor panel 114.

Power receiving unit 210 of power receiving device 200 is attached to bottom surface 112 while being contained in housing 260 in the shape of a box. As mentioned above, coil central axis O2 of power receiving coil 250 of power receiving unit 210 extends in a direction parallel to the front-back direction of vehicle body 110. In this embodiment, it is intended that coil central axis O2 of power receiving coil 250 (secondary coil) and coil central axis O1 of power transmitting coil 450 (primary coil) become parallel to each other (see FIG. 2) when electrically powered vehicle 100 is parked in parking space 340 using chocks 350 (FIG. 2) and parking lines 360 (FIG. 2) as a mark.

Figure 6:
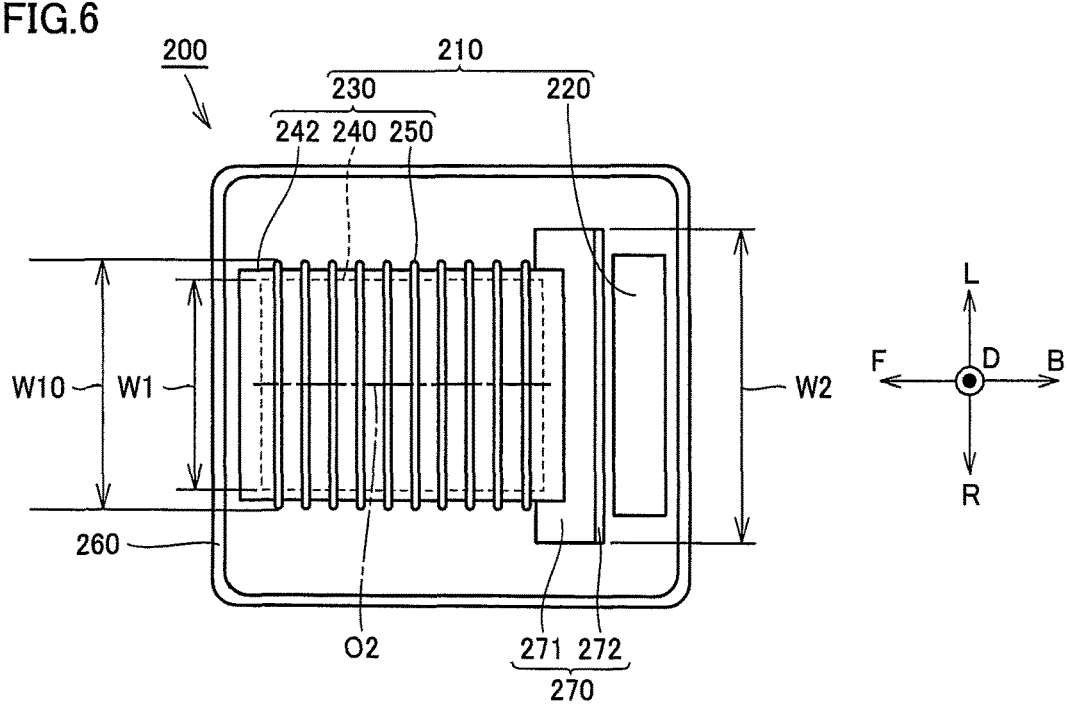
FIG. 6 shows the power receiving device when viewed two-dimensionally along the direction of an arrow VI in FIG. 5.
Figure 7:
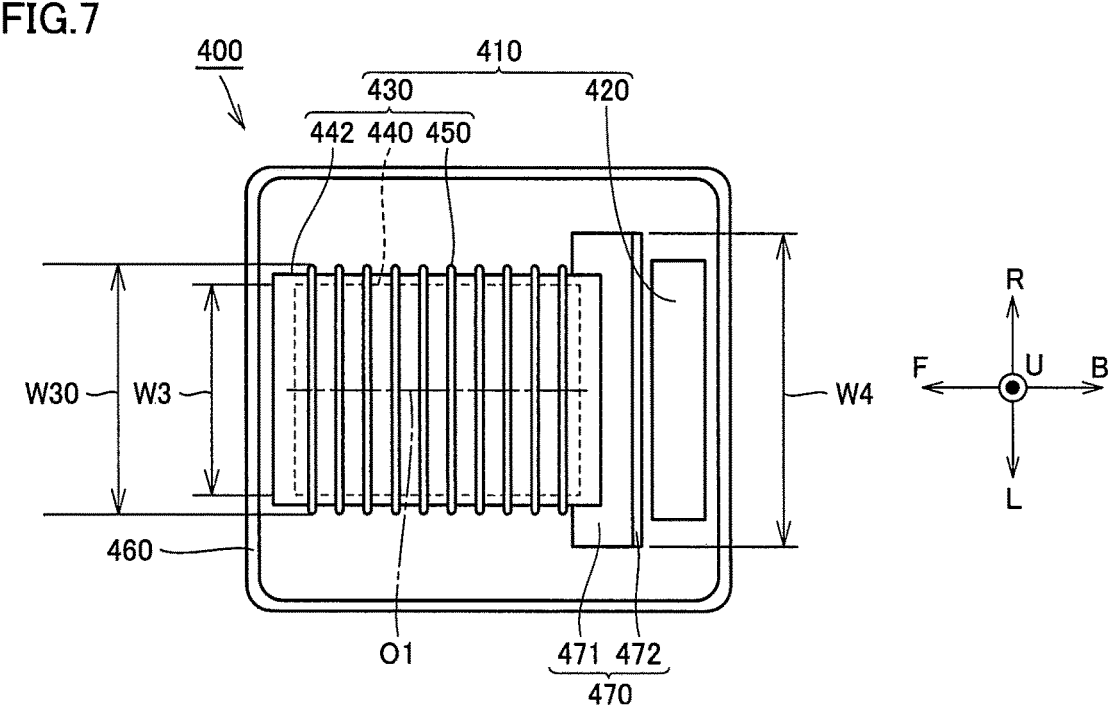
FIG. 7 shows the power transmitting device when viewed two-dimensionally along the direction of an arrow VII in FIG. 5.

FIG. 4 is a perspective view showing power receiving device 200 and power transmitting device 400. FIG. 5 is a cross-sectional view taken along line V-V in the direction of arrows in FIG. 4. FIG. 6 shows power receiving device 200 when viewed two-dimensionally along the direction of an arrow VI in FIG. 5. FIG. 7 shows power transmitting device 400 when viewed two-dimensionally along the direction of an arrow VII in FIG. 5.

Referring to FIGS. 4 to 6, power receiving device 200 in this embodiment includes power receiving unit 210, housing 260, and a shield 270. Power receiving unit 210 and shield 270 are contained in housing 260. In the vehicle width direction of vehicle body 110 (vehicle left-hand direction L and vehicle right-hand direction R), the position of coil central axis O2 of power receiving coil 250 of power receiving unit 210 matches the center position of housing 260 in the same direction. Housing 260 includes a containing portion 261 and a lid portion 267. Containing portion 261 and lid portion 267 are made of resin, for example.

Containing portion 261 includes a top plate portion 262 arranged on the side closer to floor panel 114 (FIG. 3), and peripheral wall portions 263 to 266 hanging in vertically downward direction D from an outer peripheral edge of top plate portion 262, and opens downward (vertically downward direction D). Lid portion 267 is arranged to close the opening of containing portion 261. An electromagnetic shielding plate 268 (FIG. 5) is provided on top plate portion 262 to face vertically upward direction U. Electromagnetic shielding plate 268 has the shape of a flat plate. A rectangular aluminum plate having a thickness of 1 mm, for example, can be used as electromagnetic shielding plate 268.

Power receiving unit 210 has solenoid-type coil unit 230, and capacitor 220 connected to coil unit 230. Coil unit 230 is formed of core 240 made of ferrite, fixing member 242 made of resin for fixing core 240, and power receiving coil 250 (secondary coil).

Core 240 is contained in fixing member 242 (FIG. 5). Power receiving coil 250 is wound around the peripheral surface of fixing member 242 so as to surround the space around coil central axis O2. As mentioned above, coil central axis O2 of power receiving coil 250 has a shape extending linearly in a direction parallel to the front-back direction of vehicle body 110.

Capacitor 220 is arranged adjacent to power receiving coil 250 with space therebetween in the direction in which coil central axis O2 extends. As used herein, "adjacent to" means that, for example, when power receiving coil 250 is projected in the direction in which coil central axis O2 extends, at least a portion of the projected image of power receiving coil 250 is superimposed on capacitor 220. In the direction in which coil central axis O2 extends, capacitor 220 is arranged behind power receiving coil 250 (facing vehicle backward direction B) in vehicle body 110.

Shield 270 is arranged between power receiving coil 250 and capacitor 220 in the direction in which coil central axis O2 extends. As was mentioned at the beginning, capacitor 220 may be affected by a magnetic field or electric field generated during electric power transmission, or may be affected by heat generation in the members arranged around power receiving coil 250. Shield 270 is a member for reducing such effect on capacitor 220 during electric power transmission.

Shield 270 includes a fixing portion 271 extending parallel to top plate portion 262 of housing 260 (FIGS. 4 and 5), and a wall portion 272 in the shape of a plate hanging in vertically downward direction D from an end portion of fixing portion 271 facing vehicle backward direction B. Fixing portion 271 and wall portion 272 are made of a metal material such copper, and have an L-shaped cross section as a whole.

Fixing portion 271 is a portion for fixing wall portion 272 to housing 260. Fastening tools 281 are used to fix coil unit 230 to housing 260. Fastening tools 281 fix fixing member 242, to thereby fix power receiving coil 250 to housing 260 with fixing member 242 therebetween. In this embodiment, fastening tools 281 fix power receiving coil 250 as well as fixing portion 271 of shield 270 to housing 260. In other words, fastening tools 281 fasten coil unit 230 and shield 270 together to top plate portion 262 of housing 260. It is preferable that a width dimension of fixing portion 271 be larger than a width dimension of power receiving coil 250 in the width direction of vehicle body 110. Flow of the air warmed around power receiving coil 250 toward capacitor 220 by convection can be suppressed.

Referring to FIG. 5, wall portion 272 of shield 270 is provided to separate power receiving coil 250 and capacitor 220 from each other in the direction in which coil central axis O2 extends. Wall portion 272 extends in a direction parallel to the vehicle width direction of vehicle body 110 (vehicle left-hand direction L and vehicle right-hand direction R). In the direction in which coil central axis O2 extends, a length L1 between wall portion 272 of shield 270 and an end portion of core 240 is longer than a length L2 between shield 270 and capacitor 220.

As used herein, length L1 refers to a length between the end portion of core 240 facing vehicle backward direction B and a surface portion of wall portion 272 of shield 270 facing vehicle forward direction F. As used herein, length L2 refers to a length between the end portion of capacitor 220 facing vehicle forward direction F and a surface portion of wall portion 272 of shield 270 facing vehicle backward direction B.

Referring to FIG. 6, in the vehicle width direction of vehicle body 110 (vehicle left-hand direction L and vehicle right-hand direction R), a width dimension W2 of wall portion 272 is larger than a width dimension W1 of core 240. Wall portion 272 is arranged such that, when core 240 is projected on wall portion 272 in the direction in which coil central axis O2 extends, the entire projected image of core 240 is included in wall portion 272. Wall portion 272 is arranged such that, when capacitor 220 is projected on wall portion 272 in the direction in which coil central axis O2 extends, the entire projected image of capacitor 220 is included in wall portion 272. In the vehicle width direction of vehicle body 110 (vehicle left-hand direction L and vehicle right-hand direction R), width dimension W2 of wall portion 272 may be larger than a width dimension W10 of power receiving coil 250.

(Power Transmitting Device 400)

Referring again to FIGS. 4 to 6, power transmitting device 400 in this embodiment includes power transmitting unit 410, housing 460, and a shield 470. Power transmitting unit 410 and shield 470 are contained in housing 460. Housing 460 includes a containing portion 461 and a lid portion 467. Containing portion 461 and lid portion 467 are made of resin, for example. To clearly illustrate the internal structure of power transmitting device 400, lid portion 467 is shown with a chain-double-dotted line in FIG. 4.

Containing portion 461 includes a bottom plate portion 462, and peripheral wall portions 463 to 466 rising in vertically upward direction U from an outer peripheral edge of bottom plate portion 462, and opens upward (vertically upward direction U). Lid portion 467 is arranged to close the opening of containing portion 461. An electromagnetic shielding plate 468 (FIG. 5) is provided on bottom plate portion 462 to face vertically downward direction D. Electromagnetic shielding plate 468 has the shape of a flat plate. A rectangular aluminum plate having a thickness of 1 mm, for example, can be used as electromagnetic shielding plate 468.

Power transmitting unit 410 has solenoid-type coil unit 430, and capacitor 420 connected to coil unit 430. Coil unit 430 is formed of core 440 made of ferrite, fixing member 442 made of resin for fixing core 440, and power transmitting coil 450 (primary coil).

Core 440 is contained in fixing member 442 (FIG. 5). Power transmitting coil 450 is wound around the peripheral surface of fixing member 442 so as to surround the space around coil central axis O1. As mentioned above, coil central axis O1 of power transmitting coil 450 has a shape extending linearly in a direction parallel to the front-back direction of parking space 340 (FIG. 2).

Capacitor 420 is arranged adjacent to power transmitting coil 450 with space therebetween in the direction in which coil central axis O1 extends. As used herein, "adjacent to" means that, for example, when power transmitting coil 450 is projected in the direction in which coil central axis O1 extends, at least a portion of the projected image of power transmitting coil 450 is superimposed on capacitor 420. In the direction in which coil central axis O1 extends, capacitor 420 is arranged behind power transmitting coil 450 (facing vehicle backward direction B) in parking space 340 (vehicle body 110).

Shield 470 is arranged between power transmitting coil 450 and capacitor 420 in the direction in which coil central axis O1 extends. As was mentioned at the beginning, capacitor 420 may be affected by a magnetic field or electric field generated during electric power transmission, or may be affected by heat generation in the members arranged around power transmitting coil 450. Shield 470 is a member for reducing such effect on capacitor 420 during electric power transmission.

Shield 470 includes a fixing portion 471 extending parallel to bottom plate portion 462 of housing 460 (FIGS. 4 and 5), and a wall portion 472 in the shape of a plate rising in vertically upward direction U from an end portion of fixing portion 471 facing vehicle backward direction B. Fixing portion 471 and wall portion 472 are made of a metal material such copper.

Fixing portion 471 is a portion for fixing wall portion 472 to housing 460. Fastening tools 481 are used to fix coil unit 430 to housing 460. Fastening tools 481 fix fixing member 442, to thereby fix power transmitting coil 450 to housing 460 with fixing member 442 therebetween. In this embodiment, fastening tools 481 fix power transmitting coil 450 as well as fixing portion 471 of shield 470 to housing 460. In other words, fastening tools 481 fasten coil unit 430 and shield 470 together to bottom plate portion 462 of housing 460.

Referring to FIG. 5, wall portion 472 of shield 470 is provided to separate power transmitting coil 450 and capacitor 420 from each other in the direction in which coil central axis O1 extends. Wall portion 472 extends in a direction parallel to the width direction of parking space 340 (vehicle body 110) (vehicle left-hand direction L and vehicle right-hand direction R). In the direction in which coil central axis O1 extends, a length L3 between wall portion 472 of shield 470 and an end portion of core 440 is longer than a length L4 between shield 470 and capacitor 420.

As used herein, length L3 refers to a length between the end portion of core 440 facing vehicle backward direction B and a surface portion of wall portion 472 of shield 470 facing vehicle forward direction F. As used herein, length L4 refers to a length between the end portion of capacitor 420 facing vehicle forward direction F and a surface portion of wall portion 472 of shield 470 facing vehicle backward direction B.

Referring to FIG. 7, in the width direction of parking space 340 (vehicle body 110) (vehicle left-hand direction L and vehicle right-hand direction R), a width dimension W4 of wall portion 472 is larger than a width dimension W3 of core 440. Wall portion 472 is arranged such that, when core 440 is projected on wall portion 472 in the direction in which coil central axis O1 extends, the entire projected image of core 440 is included in wall portion 472. Wall portion 472 is arranged such that, when capacitor 420 is projected on wall portion 472 in the direction in which coil central axis O1 extends, the entire projected image of capacitor 420 is included in wall portion 472. In the vehicle width direction of vehicle body 110 (vehicle left-hand direction L and vehicle right-hand direction R), width dimension W4 of wall portion 472 may be larger than a width dimension W30 of power transmitting coil 450.

(Function and Effect)

Referring again to FIGS. 2 to 5, before electric power is transmitted between power receiving device 200 and power transmitting device 400, electrically powered vehicle 100 is moved in vehicle backward direction B along parking lines 360 (FIG. 2) and parked at a prescribed position within parking space 340 using chocks 350. Power receiving device 200 and power transmitting device 400 are arranged to face each other with an air gap between them. Here, it is intended that coil central axis O2 of power receiving coil 250 (secondary coil) and coil central axis O1 of power transmitting coil 450 (primary coil) become parallel to each other.

In this embodiment, in the vehicle width direction of vehicle body 110, the position of coil central axis O2 of power receiving coil 250 matches the center position of housing 260 in the same direction (vehicle width direction). Coil central axis O2 is located in the center of bottom surface 112 of vehicle body 110 in the vehicle width direction. With regard to power transmitting device 400 provided such that coil central axis O1 is located at the center position of parking space 340 (parking lines 360, 360) in the same direction (width direction), according to vehicle body 110, power receiving unit 210 and power transmitting unit 410 can be aligned with each other readily and accurately.

Figure 8:
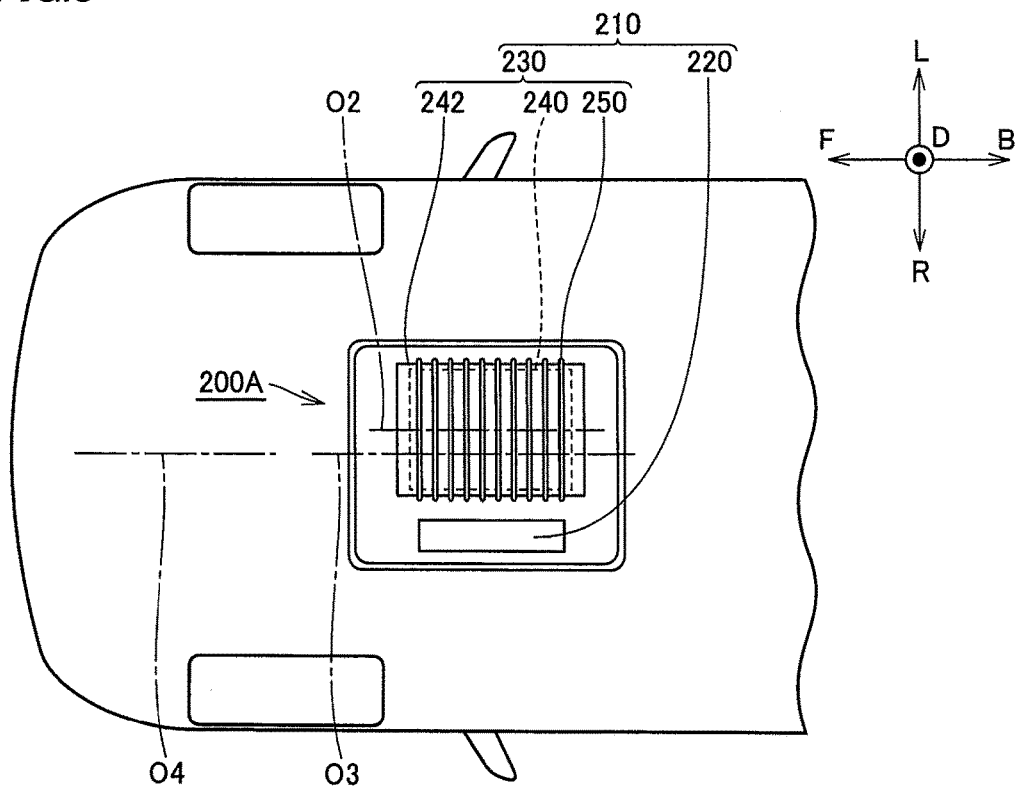
FIG. 8 is a bottom view showing an electrically powered vehicle including a power receiving device as a reference technique.

Referring to FIG. 8, it is assumed that capacitor 220 is adjacent to power receiving coil 250 in the vehicle width direction as shown in a power receiving device 200A. In this configuration, the position of coil central axis O2 of power receiving coil 250 may not match the position of a central axis O3 of housing 260 in the same direction (vehicle width direction). If housing 260 is arranged in the center in the vehicle width direction, coil central axis O2 may not be positioned in a center O4 of bottom surface 112 of vehicle body 110 in the vehicle width direction. In such a configuration of power receiving device 200A, coil central axis O2 of power receiving coil 250 and coil central axis O1 of power transmitting coil 450 may not be properly aligned with each other.

Referring again to FIGS. 2 to 5, in this embodiment, capacitor 220 of power receiving device 200 is adjacent to power receiving coil 250 in the direction in which coil central axis O2 extends (front-back direction). Coil central axis O2 is located in the center of bottom surface 112 of vehicle body 110 in the vehicle width direction, thus allowing for proper alignment between coil central axis O2 of power receiving coil 250 and coil central axis O1 of power transmitting coil 450. In this embodiment, capacitor 420 of power transmitting device 400 is also adjacent to power transmitting coil 450 in the direction in which coil central axis O1 extends (front-back direction), thereby providing a function and effect similar to above in power transmitting device 400 as well.

As was mentioned at the beginning, if a coil and a capacitor are located at positions to form a resonant circuit, the capacitor may be affected by a magnetic field or electric field generated during electric power transmission, or may be affected by heat generation in the coil or members arranged around the coil. When the capacitor is affected by them, the capacitance of the capacitor varies to vary the resonant frequency of the resonant circuit, which may result in lower power transmission efficiency.

In contrast, in power receiving device 200, such effect on capacitor 220 during electric power transmission is effectively reduced by shield 270. Shield 270 suppresses transmission of a magnetic flux and heat generated on the side of power receiving coil 250 viewed from shield 270 to capacitor 220 viewed from shield 270. Variation in capacitance of the capacitor can be suppressed to thereby suppress reduction in power transmission efficiency. In this embodiment, such effect on capacitor 420 during electric power transmission can be effectively reduced by shield 470 in power transmitting device 400 as well, thereby providing a function and effect similar to above in power transmitting device 400 as well.

In this embodiment, width dimension W2 of wall portion 272 is larger than width dimension W1 of core 240 (W2>W1). A gap is provided between peripheral wall portions 263, 265 of housing 260 (FIG. 4) and wall portion 272 of shield 270. While width dimension W2 may be equal to or smaller than width dimension W1, shield 270 may have a shape to close this gap so as to further suppress the heat transfer. Likewise, the end portion of wall portion 272 facing vertically downward direction D may have a shape that contacts lid portion 267. That is, shield 270 may have a shape that partitions the internal space of housing 260 into space where power receiving coil 250 is provided and space where capacitor 220 is provided as much as possible.

As described above, in the direction in which coil central axis O2 extends, length L1 between wall portion 272 of shield 270 and the end portion of core 240 (FIG. 5) is longer than length L2 between shield 270 and capacitor 220 (FIG. 5) (L1>L2). While length L1 may be equal to or shorter than length L2 (L1≤L2), the configuration that satisfies L1>L2 can reduce eddy current loss that occurs in shield 270 due to a magnetic flux and suppress reduction in power transmission efficiency due to the presence of wall portion 272, as compared to the configuration that satisfies L1≤L2.

In this embodiment, in power transmitting device 400 as well, length L3 between wall portion 472 of shield 470 and the end portion of core 440 (FIG. 5) is longer than length L4 between shield 470 and capacitor 420 (FIG. 5) (L3>L4). While length L3 may be equal to or shorter than length L4 (L3≤L4), the configuration that satisfies L3>L4 can reduce eddy current loss that occurs in shield 470 due to a magnetic flux as compared to the configuration that satisfies L3≤L4.

As described above, shield 270 includes fixing portion 271 extending parallel to top plate portion 262 of housing 260 (FIGS. 4 and 5), and wall portion 272 in the shape of a plate hanging in vertically downward direction D from the end portion of fixing portion 271 facing vehicle backward direction B. According to this configuration, the space above wall portion 272 in vertically upward direction U is closed by fixing portion 271 to thereby reduce heat transfer by convection.

As described above, fastening tools 281 (FIG. 5) are used to fix coil unit 230 to housing 260. Fastening tools 281 fix fixing member 242, to thereby fix power receiving coil 250 to housing 260 with fixing member 242 therebetween. In this embodiment, fastening tools 281 fix power receiving coil 250 as well as fixing portion 271 of shield 270 to housing 260. In other words, fastening tools 281 fasten coil unit 230 and shield 270 together to top plate portion 262 of housing 260. Fastening tools 281 double as means for fixing coil unit 230 and means for fixing shield 270, thus facilitating operation when assembling power receiving device 200.

As described above, in the front-back direction of vehicle body 110 (FIG. 3), power receiving device 200 is arranged behind engine 119 and in front of center position P1. In the direction in which coil central axis O2 extends, capacitor 220 is arranged behind power receiving coil 250 in vehicle body 110. Capacitor 220 is arranged opposite to catalyst 117 relative to power receiving coil 250. While the positional relation between capacitor 220 and power receiving coil 250 may be reversed, variation in capacitance of the capacitor can be further suppressed by arranging capacitor 220 away from heat sources such as engine 119 and catalyst 117. The position of power receiving device 200 may be determined in consideration of the positions of heat sources such as engine 119 and catalyst 117. In so doing, a configuration where capacitor 220 is arranged in front of power receiving coil 250 in vehicle body 110 may be employed as needed.

Variation in vehicle height is smaller on the front side of vehicle body 110 where engine 119 is arranged than the rear side of vehicle body 110 where a trunk room and a passenger compartment are arranged. Since power receiving device 200 is arranged in front of center position P1, the height position of power receiving device 200 is less likely to be affected by the vehicle height variation, thus allowing for electric power transmission under conditions (such as impedance) close to those predetermined by design.

Although the embodiments of the present invention have been described above, it should be understood that the embodiments disclosed herein are illustrative and non-restrictive in every respect. The scope of the present invention is defined by the terms of the claims, and is intended to include any modifications within the scope and meaning equivalent to the terms of the claims.

What is claimed is:

1. A power receiving device arranged on a bottom surface of a vehicle body, comprising:
   a power receiving coil formed to surround space around a coil central axis extending in a front-back direction of the vehicle body, for receiving electric power from a power transmitting coil in a non-contact manner while facing the power transmitting coil;
   a capacitor arranged adjacent to the power receiving coil in the direction in which the coil central axis extends;
   a shield arranged between the power receiving coil and the capacitor, the shield including:
      a wall portion positioned between the power receiving coil and the capacitor, and
      a fixing portion for fixing the wall portion to a housing containing the power receiving coil; and
   a fastening tool fixing the power receiving coil to the housing;
   wherein a width dimension of the fixing portion in a width direction of the vehicle body is larger than a width dimension of the power receiving coil in the width direction of the vehicle body, and the fixing portion is fixed to the housing by the fastening tool.

2. The power receiving device according to claim 1, further comprising:
   a core around which the power receiving coil is wound;
   wherein, in the direction in which the coil central axis extends, a length between the shield and the core is longer than a length between the shield and the capacitor.

3. A power receiving device arranged on a bottom surface of a vehicle body, comprising:

a power receiving coil formed to surround space around a coil central axis extending in a front-back direction of the vehicle body, for receiving electric power from a power transmitting coil in a non-contact manner while facing the power transmitting coil;

a capacitor arranged adjacent to the power receiving coil in the direction in which the coil central axis extends;

a shield arranged between the power receiving coil and the capacitor; and a core around which the power receiving coil is wound;

wherein, in the direction in which the coil central axis extends, a length between the shield and the core is longer than a length between the shield and the capacitor.

4. A vehicle comprising:

an engine provided in front of a center position in a front-back direction of a vehicle body; and the power receiving device according to claim 3, wherein, in the front-back direction of the vehicle body, the power receiving device is arranged behind the engine and in front of the center position.

5. The vehicle according to claim 4, further comprising a catalyst connected to the engine, wherein in the front-back direction of the vehicle body, the power receiving coil is arranged behind the catalyst, and in the front-back direction of the vehicle body, the capacitor is arranged behind the power receiving coil.

* * * * *